United States Patent [19]
Felter

[11] 4,305,292
[45] Dec. 15, 1981

[54] METHODS AND APPARATUS FOR BALANCING CEILING FAN BLADES TO IMPROVE THEIR AERODYNAMIC PERFORMANCE

[76] Inventor: John V. Felter, P.O. Box 7464, Houston, Tex. 77008

[21] Appl. No.: 143,596

[22] Filed: Apr. 25, 1980

[51] Int. Cl.³ .............................................. G01M 1/14
[52] U.S. Cl. ........................................ 73/455; 73/456
[58] Field of Search ................. 73/455, 456; 416/144, 416/61; 29/156.8 R, 156.8 B, 156.8 P, 156.8 CF, 407

[56] References Cited
U.S. PATENT DOCUMENTS 2,552,739 5/1951 Roberts ................................. 416/61
4,053,123 10/1977 Chadwick ............................. 73/455

FOREIGN PATENT DOCUMENTS 1446960 6/1966 France .................................. 416/61

*Primary Examiner*—James J. Gill
*Attorney, Agent, or Firm*—Carl B. Fox, Jr.

[57] ABSTRACT

Method and apparatus for use in balancing the blades of ceiling fans, wherein the pitch angles of the blades and the dihedral angles of the blades are measured and corrected, if necessary, by use of a beam of light reflected from a mirror temporarily flushly affixed to each blade, and wherein indexes are provided for measuring and correcting, if necessary, the circular angularities between the blades. Blades may be tested both individually or in sets connected to a hub.

15 Claims, 4 Drawing Figures

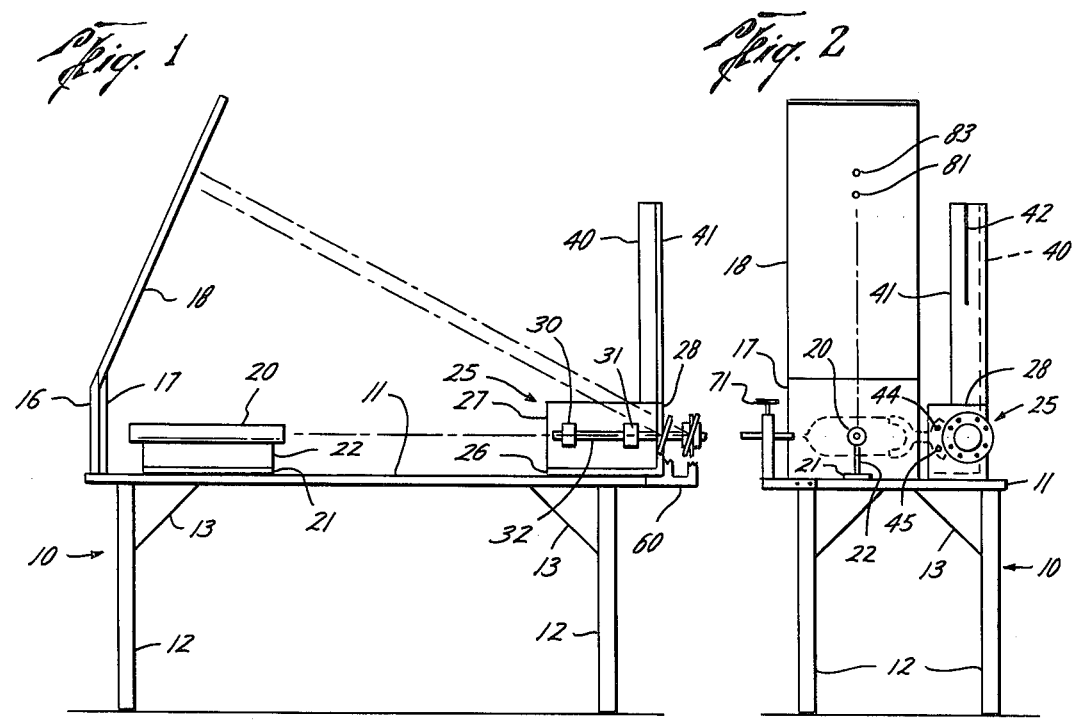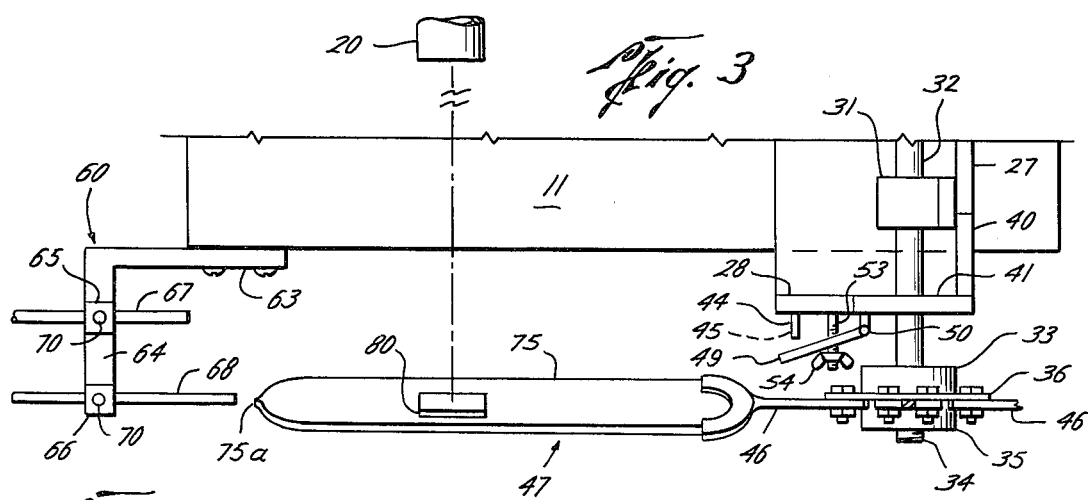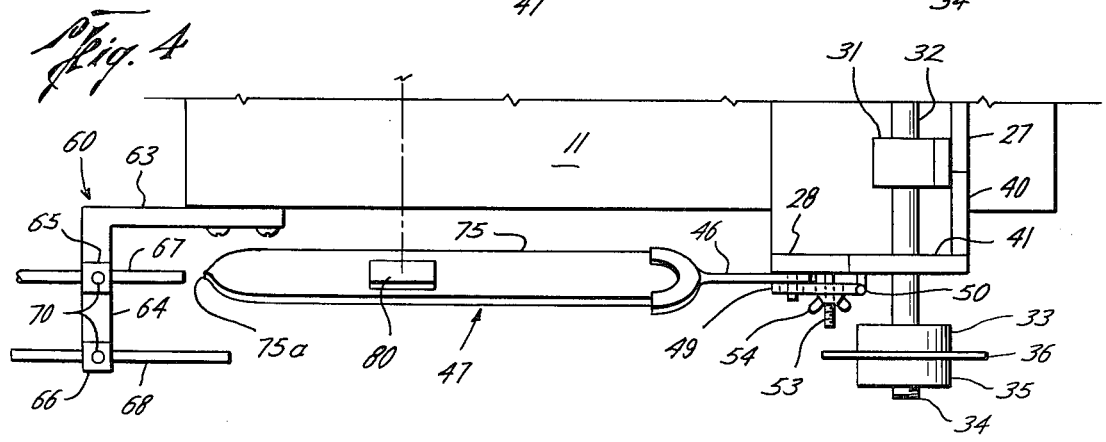

METHODS AND APPARATUS FOR BALANCING CEILING FAN BLADES TO IMPROVE THEIR AERODYNAMIC PERFORMANCE

BACKGROUND OF THE INVENTION

Ceiling fans are subject to vibration, noise, and excessive wear in operation if the blades of the ceiling fan are not in balance. Modern ceiling fans, because of the relatively lightweight construction used as compared with earlier constructions, are more subject to vibration, noise and faulty operation than was encountered in the past. The blades, usually formed of wood and almost always four in number, are mounted to a central rotatable hub by fittings which are referred to as blade irons. The blade irons are subject to being bent during handling and shipment. Vibrations in ceiling fan operation may be brought about by incorrect pitch angle of one or more blades, or by an incorrect angle between adjacent blades (herein referred to as the circular angle), or by lack of uniformity of the vertical angle from horizontal of oppositely disposed blades (herein referred to as the dihedral angle). The invention seeks to provide methods and apparatus for proper balancing and alignment of ceiling fan blades, whereby vibrations and noise during operation of the ceiling fans will not occur and whereby undue wear and faulty operation will not be encountered.

SUMMARY OF THE INVENTION

The invention provides methods and apparatus for balancing and alignment of ceiling fan blades, to prevent vibration and noise during ceiling fan operation and to eliminate excessive wear and faulty operation of ceiling fans. Methods and apparatus are provided according to the invention whereby pitch angle and dihedral angle of the ceiling fan blades are determined by reflection of light from a mirror temporarily affixed to the blade. The circular angles of the blades about the hub are determined by reference or index means.

Two types of tests or determinations of fan blade balance are made according to the invention, the first being a balance determination for individual blades, and the second being balance determinations for each of a set of blades mounted on a hub. The apparatus includes provisions for both types of tests. For testing of an individual blade, the blade is temporarily supported at a proper predetermined position while its angularities are measured. For the second type of tests of sets of blades mounted on a hub, a shaft is provided on which the hub may be rotatably mounted so that each blade on the hub may be swung to a proper predetermined position for testing.

It has been found that ceiling fan operation is greatly improved through use of the methods and apparatus afforded by the invention. Vibration and noise during ceiling fan operation can be substantially completely eliminated, thereby eliminating other faults in operation attributable to lack of blade balance.

A principal object of the invention is to provide methods and apparatus for balancing the blades of ceiling fans. Another object of the invention is to provide such methods which are simple, safe, and reliable. A further object of the invention is to provide such methods and apparatus using reflection of a beam of light to determine blade angles. Another object of the invention is to provide such methods and apparatus utilizing indexes or reference points for determining blade angularities.

Other objects and advantages of the invention will appear from the following detailed descriptions of preferred embodiments thereof, reference being made to the accompanying drawings.

BRIEF DESCRIPTIONS OF THE DRAWINGS

FIG. 1 is a side elevation of an apparatus of preferred form according to the invention, FIG. 1 also indicating the methods according to the invention.

FIG. 2 is a front elevation of the apparatus shown in FIG. 1, further illustrating the methods FIGS. 3 and 4 are partial top elevations showing the apparatus shown in FIGS. 1 and 2, and further illustrating the test methods.

DESCRIPTIONS OF THE PREFERRED EMBODIMENTS

Referring now to the drawings in detail, a table 10 includes an upper or top panel 11 supported by four legs 12 reinforced by triangular gussets 13. The table top 11 is rectangular, its length being substantially greater than its width. At one of its ends, a support formed by plates 16, 17 is provided, to which is affixed angular plate 18. The upper ends of plates 16, 17 and the lower end of plate 18 are beveled as shown to provide flush interfits between these elements. Angular plate 18 may be additionally braced to be rigidly positioned, if desired.

A light source 20 is supported by base plate 21 and vertically disposed plate 22, the base plate 21 being affixed to the top 11 of table 10. Light source 20 is preferably a laser beam apparatus capable of emitting a confined pencil or beam of light of small diameter. Any other suitable light source device may be used.

A shaft support 25 formed by a base plate 26 and mutually perpendicular side plates 27, 28 is affixed adjacent a corner of table top 11 opposite support plates 16, 17, as shown. Plate 27 has bearing supports 30, 31 affixed to its inner side, which support a shaft 32 which is horizontally disposed parallel with table top 11. Shaft 32 extends freely through an opening through plate 28. At the end of shaft 32, beyond plate 28, a circular flange or collar 33 is affixed to shaft 32. The end of shaft 32 is threaded at 34 and a collar 35 has a threaded central opening therethrough adapted to be screwed onto shaft 32. A ceiling fan blade hub 36 may be affixed to shaft 32 by removal of collar 35, the hub having a central opening matching the diameter of shaft 32, and collar 35 screwed onto the shaft end clamping the hub firmly and concentrically in place about shaft 32. Any other suitable manner for affixing blade hubs 36 to shaft 32 may be utilized. Plates 40, 41, having their longitudinal edges joined, are affixed vertically at the corner formed between plates 27, 28, and plate 41 has inscribed thereon an index line 42 which is disposed vertically.

Plate 28 carries a pair of pins 44, 45, pin 44 being vertically above pin 45, which are disposed equally above and below the axis of shaft 32. Each blade iron 46 of a ceiling fan blade 47 has two bolt or rivet openings therethrough which are spaced to receive the pins 44, 45.

A plate 49 is pivotally connected to plate 28 at hinge 50. Plate 49 has a pair of vertically spaced slots adapted to be received around the pins 44, 45 with the plate 49 parallel to plate 28. A threaded stud 53 is affixed to plate 28, and plate 49 has a slot through which stud 53 freely extends. A wing nut 54 screwed onto stud 53 may be loosened to allow outward pivoting of plate 49, and may be tightened to clamp a blade iron 46 between plates 28 and 49. Any other form of clamp device suitable for holding a blade iron flushly against plate 28, with the pins 44, 45 extending through the bolt holes of the blade iron, may be substituted.

A bracket 60 is affixed to the end of table top 11, as shown. Bracket 60 has mutually perpendicularly disposed portions 63, 64, portions 65, 66 extending upwardly from portion 64. Each portion 65, 66 has a transverse opening to closely but slidably receive the respective rods 67, 68, and each has a vertical tapped opening into which is screwed the threaded shank 70 of a screw 71. The head of each screw 71 is in the form of a hand wheel, so that the shanks 70 may be screwed down against the rods 67, 68 to fix their longitudinal positions through the transverse openings through portions 65, 66.

Each ceiling fan blade 47 includes a flat blade plate 75 which is affixed to one end of a blade iron 46. The outer end of each blade iron is in the form of a yoke which is internally grooved to receive the inner end of the blade plate 75. The central shank portion of each blade iron is capable of being bent to adjust the position and angularity of the blade plate 75.

To test a single blade 47 for balance and alignment, the blade iron 46 thereof is fixed to pins 44, 45 by the clamp bar 49, as shown in FIG. 4. The tip 75a of the blade plate is aligned with inner rod 67, as shown in FIG. 4. The extent of rod 67 may be adjusted to be close to the end of the blade tip by loosening the screw 71 and positioning rod 67 longitudinally, and then retightening screw 71. If the tip of the blade plate does not align with rod 67 because of improper circular angle and/or because of improper dihedral angle, adjustment is made of the blade tip position by bending of blade iron 46 at its central shank portion.

A mirror 80 is flushly temporarily adhered to the blade plate surface in line with light source 20. When a light beam from source 20 is impinged against the mirror adhered to the blade surface, the light beam is reflected against plate 18. Plate 18 may have a target or other indicia inscribed thereon, as at 81, to indicate where the reflected light beam should strike plate 18. Deviation of the reflected light beam from the desired point because of improper blade pitch angle and/or improper dihedral angle may be corrected by bending of the shank of blade iron 46 so that the reflected light strikes the target at its center. After such testing and adjustment, the blade should be of proper alignment for proper balance and may be removed for testing of another fan blade.

Blade weights may, of course, be tested by weighing of the connected blade plates and blade irons.

For testing of a set of fan blades 47 affixed to a hub 36, the hub is clamped at the end of shaft 32, as previously described and as shown in FIG. 3. A set of blades 47 usually consists of four blades, disposed 90° apart around the hub. Each fan blade of the set may be rotated to bring its tip in line with rod 67, adjustment of the position of each blade tip being made by bending of the blade iron shank, if necessary.

A mirror 80 is temporarily affixed to each blade as it is positioned for testing, and the beam of light from source 20 is reflected to plate 18. Since the blades mounted on the hub are farther from the end of table top 11 than when a single blade is mounted at pins 44, 45, the light will be reflected to a more elevated target 83, and the light impingement at the target being adjusted if necessary by bending of the blade iron shank until correct. Each blade in turn may be rotated about shaft 32 to test position. The angularity between adjacent blades is checked by aligning one blade with rod 68 and checking the position of an adjacent blade at index 42. The circular angularities of the blades completely around the hub may be checked in this manner. The targets 81, 83 may be positioned to accomodate any selected blade pitches and dihedral angles desired. While the pitch and angle may be varied, for a particular set of blades they should be the same for each blade in order that the ceiling fan when in operation will not be subjected to vibration and possible resulting malfunction.

The apparatus and methods herein described will serve to greatly improve the performance of ceiling fans and to make their operation vibrationless and quiet.

While preferred methods and apparatus according to the invention have been shown in the drawings and described, many modifications thereof may be made by a person skilled in the art without departing from the spirit of the invention, and it is intended to protect by Letters Patent all forms of the invention falling within the scope of the following claims.

I claim:

1. Method for aligning fan blades to improve the rotational balance thereof, each fan blade comprising a flat blade plate affixed to a blade iron at its inner end, and each blade iron having plural openings therethrough for use in connecting the blade iron to a hub and having an intermediate shank portion, comprising supporting the fan blade having a mirror fixed flushly to its blade plate in a predetermined position by engaging said plural openings with support means, directing a beam of light against said mirror, determining the direction of the reflected beam of light from said mirror to determine the pitch angle and dihedral angle of said blade plate, and adjusting said pitch angle and said dihedral angle of said blade plate as necessary to bring said reflected beam of light to a predetermined direction by bending said shank portion of the blade iron.

2. Method according to claim 1, including supporting the fan blade in said predetermined position by clamping the blade iron against a fixed flat surface with pin means extending from said flat surface engaged through said plural openings through the blade iron.

3. Method according to claim 1, including supporting the fan blade in said predetermined position by affixing said blade iron to a fan blade hub and supporting the hub for rotation about a shaft supported in a fixed position, whereby the fan blade may be rotated through positions including said predetermined position by rotation of said hub.

4. Method according to claim 3, including supporting additional fan blades about said hub, and rotating said hub to bring each fan blade in turn to said predetermined position for said determination of the direction of said reflected light and said adjustment as necessary.

5. Method according to claim 4, including providing indicia at a predetermined angle about said shaft from said predetermined position, determining the circular angle between two of said fan blades by comparison of said fan blades with said predetermined position and said indicia, and correcting said circular angle as necessary by bending one or more of said shank portions of the blade irons.

6. Apparatus for aligning fan blades to improve the rotational balance thereof, each fan blade comprising a flat blade plate affixed to one end portion of a blade iron at its inner end, and each blade iron having plural openings therethrough at its opposite end for use in connecting the blade iron to a hub and having an intermediate shank portion, comprising a light source supported to emit a beam of light in a predetermined direction, means for supporting a said fan blade in a predetermined position with its flat blade plate intersecting said predetermined direction, and a flat mirror flushly fixed to the blade plate whereby said beam of light will be reflected in an angular direction indicating the angular position of said blade plate.

7. The combination of claim 6, said supporting means comprising surface means having plural pin means protruding therefrom adapted to be received through said blade iron openings, and clamp means adapted to hold said blade iron flushly against said surface means.

8. The combination of claim 6, said supporting means comprising hub means to which said blade iron of each fan blade may be bolted through said plural openings, and means for mounting said hub means for rotation about its axis, whereby said hub means may be rotated to successively bring plural fan blades affixed thereto to said predetermined position.

9. The combination of claim 6, including index means supported at the tip of each said fan blade supported in said predetermined position.

10. The combination of claim 9, said index means comprising bar means disposed longitudinally of said predetermined position, and means for adjusting the longitudinal position of said bar means with respect to the tip of a fan blade supported in said predetermined position, whereby the proximity of an end of said bar means with respect to a said tip may be adjusted.

11. The combination of claim 10, said supporting means comprising first supporting means for supporting a said fan blade in a first said predetermined position comprising surface means having plural pin means protruding therefrom adapted to be received through said blade iron openings, and clamp means adapted to hold said blade iron flushly against said surface means, and comprising second supporting means for supporting a said fan blade in a second said predetermined position comprising hub means to which said blade iron of each fan blade may be bolted through said plural openings, and means for mounting said hub means for rotation about its axis, whereby said hub means may be rotated to successively bring plural fan blades affixed thereto to said second predetermined position.

12. The combination of claim 11, including separate index means supported at the tip of each said fan blade supported in each of said first and second predetermined positions.

13. The combination of claim 12, each said index means comprising a separate bar disposed longitudinally of each of said first and second longitudinal positions, and means for adjusting the longitudinal position of each said bar with respect to the tip of a fan blade supported in the respective predetermined position, whereby the proximity of an end of each said bar with respect to the tip of a fan blade in the respective predetermined position may be adjusted.

14. The combination of claim 9, 10, or 13, including second index means supported at a fixed angle from said index means for determining the circular angle between adjacent fan blades on said hub means.

15. The combination of claim 6, 7, 8, 9, 10, 11, 12, or 13, including target means for receiving a light beam reflected from a said mirror, whereby deviations of the direction of said reflected light beam from a correct direction may be determined.

* * * * *